E. B. HESS.
TYPE WRITING MACHINE.
APPLICATION FILED APR. 17, 1909.
955,964.
Patented Apr. 26, 1910.
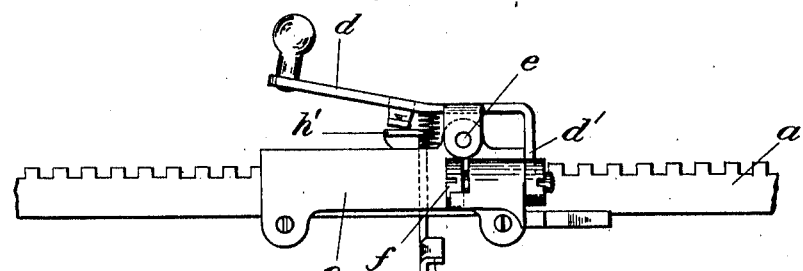
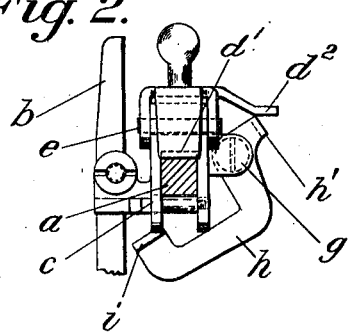
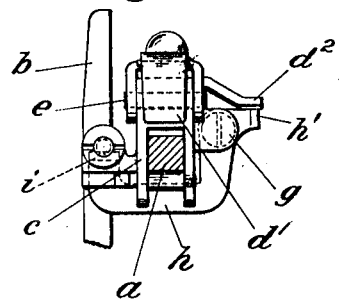
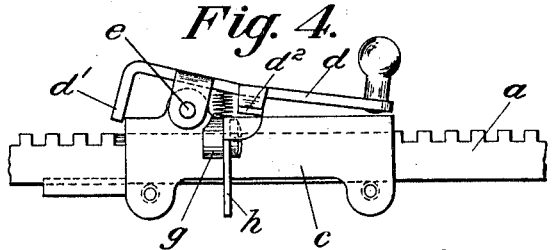
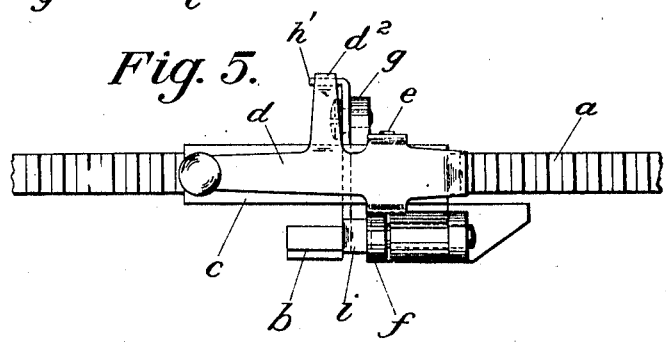
WITNESSES:
INVENTOR
Edward B. Hess
BY Edward C. Davidson
ATTORNEY

UNITED STATES PATENT OFFICE.

EDWARD B. HESS, OF NEW YORK, N. Y., ASSIGNOR TO ROYAL TYPEWRITER COMPANY, OF NEW YORK, N. Y., A CORPORATION OF NEW JERSEY.

TYPE-WRITING MACHINE.

955,964.  Specification of Letters Patent. Patented Apr. 26, 1910.

Application filed April 17, 1909. Serial No. 490,527.

*To all whom it may concern:*

Be it known that I, EDWARD B. HESS, a citizen of the United States of America, residing in the borough of Manhattan, city, county, and State of New York, have invented certain Improvements in Type-Writing Machines, of which the following is a specification.

My invention comprises an improvement upon the invention disclosed and claimed in the patent of Lewis C. Myers No. 947,450, dated January 25, 1910, and consists of an arrangement wherein the gage is normally out of effective position but is moved into effective position by the grasp of the operator upon the adjustable stop, thereby insuring proper adjustment of the stops, and then automatically returns, when the grasp of the operator is removed, to normal position.

In the accompanying drawing: Figure 1 is a side elevation disclosing my improvement: Fig. 2, an end elevation showing the carriage stop rack bar in section and the stop latch engaged with the rack: Fig. 3, a like view showing the stop latch disengaged from the rack and the gage moved into operative relation to the center stop: Fig. 4, a view of the opposite side of Fig. 1: and Fig. 5, a plan view.

$a$ indicates the ordinary carriage rack bar upon which is adjustably mounted the usual movable carriage stop; and $b$ indicates the usual fixed or center stop mounted on the frame.

$c$ is the frame of the movable stop that determines the left hand margin of the printed matter: $d$, the latch pivoted at $e$ on this frame and whose end $d'$ engages the recesses in the rack bar. The rigid stop surface $f$ is provided by the head of an adjustable screw bolt mounted in the frame at the side thereof. An arrangement of such a margin stop and center stop is shown in Patent No. 875,430 granted December 31, 1907, to me which discloses the stop devices of a Royal Standard machine now well known. To provide a gage for setting the stop surface $f$ an excess distance equal to one letter space away from the fixed or center stop $b$ there is pivoted at $g$ on an axis parallel with the rack and on the front face or side of the frame $c$ an angular lever arm $h$. This lever has an upwardly extending projection $h'$ adapted to be struck by a projection $d^2$ at the side of the latch when it is moved to disengage the rack, and to be then moved downwardly. The part of the angular lever $h$ below pivot $g$ extends under the frame and rack bar so that its extreme end $i$ will be swung up in front of the rigid stop surface $f$ into position to contact with the center stop $b$ when the margin stop is being adjusted. When the adjustment has been made and latch $d$ is released, the angular lever will, by gravity, fall so that its end $i$ passes from between its stop surface $f$ and the center stop, the lever being finally arrested in the position shown in Fig. 2 by its end $h'$ contacting with the under face of the projection $d^2$ on the latch.

The characteristic feature of my invention is that the gage is normally out of operative relation to the stop surface $f$, is moved into operative relation thereto when the movable stop is adjusted on the rack bar, and after such adjustment returns to normal inoperative position. The width of the end $i$ of the gage lever corresponds with one letter space. As shown the gage is in the form of an angular lever made of sheet metal, the end $h'$ being turned at right angles to afford an enlarged surface for contact with projection $d^2$ and its opposite or gage end being likewise turned over at right angles to afford a width equal to one letter space.

I am aware that this device may be embodied in a variety of forms.

It is preferred that the gage should be normally maintained in inoperative position by gravity in preference to resorting to the use of springs.

The characteristic feature of this invention is that the gage is normally out of position and it is automatically brought into gaging position when adjustment of the movable stop is made by the operator.

I claim:

1. Margin stop devices comprising a fixed and a movable stop, a gage normally out of operative relation to the stop surfaces of the stops and adapted to be interposed between them to adjust them a distance from each other equal to one letter space, and means for automatically effecting interposition of such gage between such surfaces when the movable stop is adjusted.

2. Margin stop devices comprising a fixed and a movable stop, a gage adapted to be interposed between the stop surfaces of such two stops but normally maintained out of such position by gravity and means for automatically interposing the gage between such surfaces when the movable stop is adjusted.

3. Margin stop devices comprising a fixed and a movable stop, a gage pivoted upon the frame of the movable stop and adapted to be interposed between the stop surfaces of the stop but normally withdrawn therefrom, a rack bar upon which the stop frame is mounted, a latch carried by the frame for engaging and disengaging the rack bar and means whereby on disengagement of the latch from the rack bar for adjustment of the movable stop the gage is automatically interposed between said stop surfaces.

4. Margin stop devices comprising a fixed and a movable stop, a gage adapted to be interposed between the stop surfaces of such two stops but normally maintained out of such position and means for automatically interposing the gage between such surfaces when the movable stop is adjusted.

In testimony whereof, I have hereunto subscribed my name.

EDWARD B. HESS.

Witnesses:
F. C. Myers,
A. J. Sheridan.